(12) United States Patent
Oishi et al.

(10) Patent No.: US 6,498,416 B1
(45) Date of Patent: Dec. 24, 2002

(54) ELECTROMAGNETIC ACTUATOR PERMANENT MAGNET

(75) Inventors: Kenichi Oishi, Okazaki (JP); Motoyoshi Ando, Nagoya (JP); Hiroyuki Nakane, Okazaki (JP); Seiji Tachibana, Kariya (JP); Tetsuya Aoki, Toyoake (JP)

(73) Assignee: Denso Corporation (JP)

( * ) Notice: Subject to any disclaimer, the term of this patent is extended or adjusted under 35 U.S.C. 154(b) by 45 days.

(21) Appl. No.: 09/597,819

(22) Filed: Jun. 19, 2000

(30) Foreign Application Priority Data

Jun. 23, 1999 (JP) .............................. 11-176696
Jan. 31, 2000 (JP) ........................... 2000-021497
Mar. 7, 2000 (JP) ........................... 2000-062109

(51) Int. Cl.[7] .............................................. H01F 7/127
(52) U.S. Cl. ...................................................... 310/214
(58) Field of Search ........................... 310/12, 14, 193; 137/625.5, 909, 625; 251/48; 335/297, 28, 278

(56) References Cited

U.S. PATENT DOCUMENTS

| 2,853,659 A | | 9/1958 | Herion | |
|---|---|---|---|---|
| 3,460,081 A | * | 8/1969 | Tillman | ....................... 310/14 |
| 4,809,749 A | | 3/1989 | Ichibashi | |
| 5,259,414 A | * | 11/1993 | Suzuki | ................... 137/625.65 |
| 5,769,391 A | | 6/1998 | Noller et al. | |
| 5,779,220 A | * | 7/1998 | Nehl et al. | .............. 123/568.26 |

FOREIGN PATENT DOCUMENTS

| JP | 57-164371 | | 10/1982 |
|---|---|---|---|
| JP | 61-44411 | | 3/1986 |
| JP | 2-44703 | | 2/1990 |
| JP | 7-189852 | | 7/1995 |
| JP | 8-288132 | | 11/1996 |
| JP | 2001-332419 | * | 11/2001 |

* cited by examiner

*Primary Examiner*—Tran Nguyen
*Assistant Examiner*—Karen B Addison
(74) *Attorney, Agent, or Firm*—Nixon & Vanderhye PC

(57) ABSTRACT

An electromagnetic actuator has a stator core, an armature and a coil. The stator core is formed as a seamless cylindrical tube having a thin wall as a magnetic restrictor. The thin wall has a thickness sufficient to maintain a mechanical strength of the stator core. A permanent magnet is located on an outside of the thin wall to generate a magnetic flux passing through the thin wall in the same direction as a magnetic flux generated by the coil. The thin wall is magnetically saturated with the magnetic flux generated by the permanent magnet. When the coil is energized, a magnetic flux generated by the coil gets around the saturated thin wall and passes through the armature.

37 Claims, 17 Drawing Sheets

L/D=0.5

L/D=1.0

L/D=1.5

L/D=0.5

L/D=1.0

L/D=1.5

ELECTROMAGNETIC ACTUATOR PERMANENT MAGNET

CROSS REFERENCE TO RELATED APPLICATION

This application is based on Japanese Patent Application No. Hei 11-176696 filed on Jun. 23, 1999, No.2000-21497 filed on Jan. 31, 2000 and No.2000-62109 filed on Mar. 7, 2000, the contents of which are incorporated herein by reference.

BACKGROUND OF THE INVENTION

1. Field of the Invention

The present invention relates to an electromagnetic actuator for actuating a valve or the like.

2. Description of Related Art

JP-U-57-164371 discloses an electromagnetic actuator having a seamless cylindrical stator core accommodating an armature core. The stator core has a thin wall portion for guiding a magnetic flux into the armature core. However, since the stator core must be a magnetic material, the thin wall portion still conducts a small amount of magnetic flux therein. Further, a thickness of the thin wall portion must be a specific value to maintain a required mechanical strength. Therefore, an additional current is required to provide a sufficient magnetic flux through the armature core.

SUMMARY OF THE INVENTION

The present invention addresses these drawbacks by providing an improved stator arrangement.

It is therefore an object of this invention to provide an electromagnetic actuator having a stator core in which a magnetic flux generated by a coil is effectively guided into an armature.

It is a further object of this invention to provide a reliable structure of the electromagnetic actuator having a seamless stator core.

According to a first aspect of the present invention, an electromagnetic actuator has an armature, a stator core, a coil and a permanent magnet. The permanent magnet generates a magnetic flux passing through a housing of the stator core in the same direction as a magnetic flux generated by the coil. Therefore, the magnetic flux generated by the permanent magnet at least narrows a magnetic flux path in the housing. When the coil is energized, the magnetic flux generated by the coil is directed toward the armature.

According to a further aspect of the present invention, the following arrangement may be used. The permanent magnet may be fixed on a concave portion of the housing. In this case, the concave portion forms a thin wall on the housing. This thin wall is saturated with a magnetic flux generated by the permanent magnet. The permanent magnet may be formed by a plurality of permanent magnets. Further, the permanent magnet is preferably formed into an annular shape.

The permanent magnet may have a shape which prevents demagnetization. Such a shape can be a cut-off portion formed at a corner where the magnetic flux generated by the coil is concentrated.

The housing may have a guide portion only located between a permanent magnet and one axial end of the stator core. The guide portion guides a magnetic flux in an axial direction. For instance, a tapered portion formed on both an inner surface of the housing and an outer surface of the armature, a tapered portion formed on an outer surface of the housing or a attracting portion formed on a one axial end of the housing may act as the guiding portion.

The armature may be formed a columnar shape having an axial length L and a diameter D. In this case, a ratio L/D should be not less than 1.0.

BRIEF DESCRIPTION OF THE DRAWINGS other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Hereinafter, several preferred embodiments of the present invention will be explained with reference to the accompanying drawings.

FIRST EMBODIMENT

Figure 1:
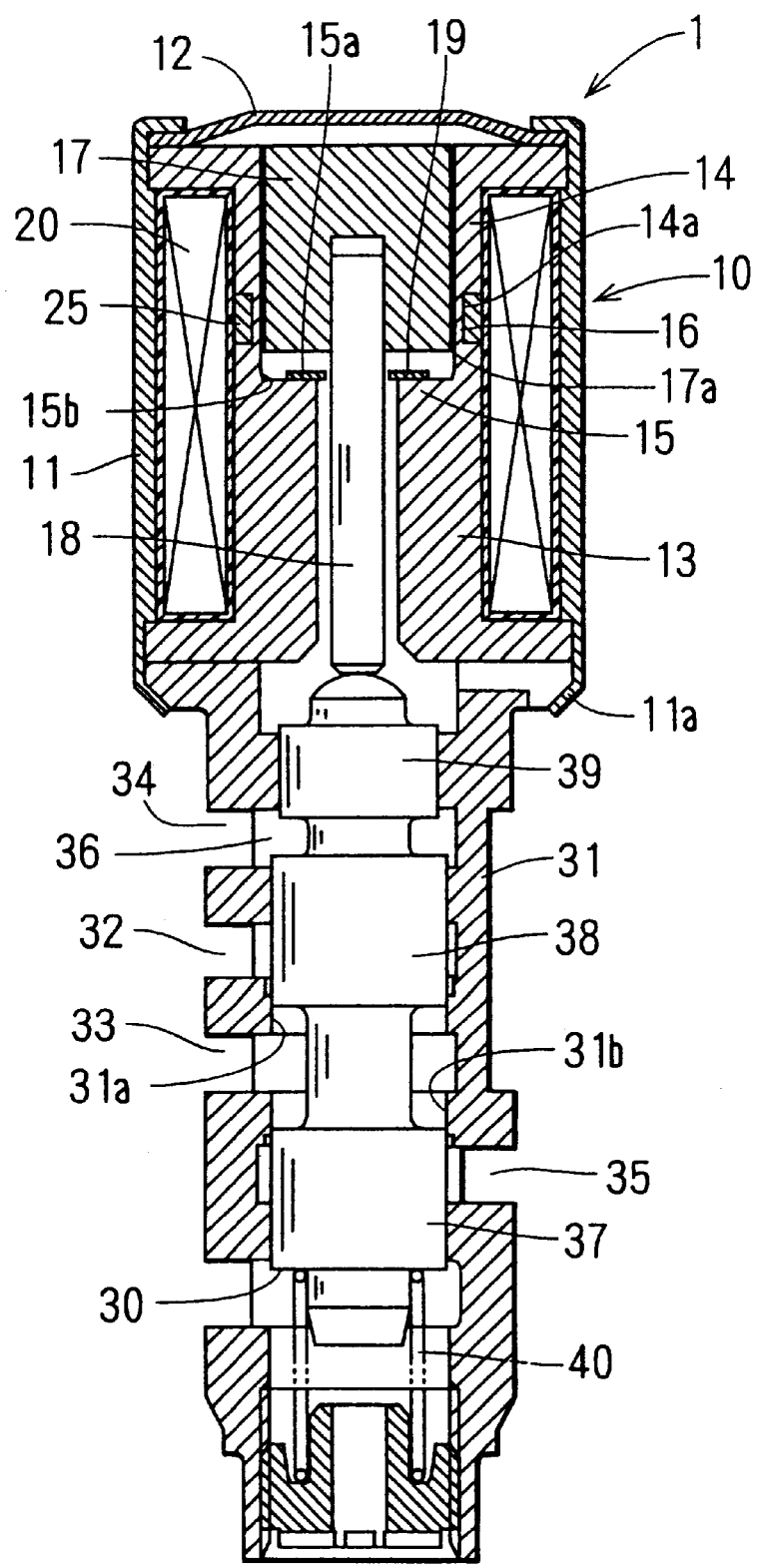
FIG. 1 is a sectional view of a valve according to a first embodiment of the present invention.

FIG. 1 shows an electromagnetic valve according to a first embodiment of the present invention. The electromagnetic valve 1 is a spool type hydraulic control valve for controlling a pressure of oil supplied for a hydraulic controller of an automatic transmission for a vehicle.

A linear solenoid 10 as an electromagnetic actuator has a cylindrical yoke 11, an end plate 12, a stator core 13, a plunger 17 which acts as an armature, a shaft 18 and a coil 20. The yoke 11 and the stator core 13 form a stator. The yoke 11, the end plate 12, the stator core 13 and the plunger 17 are made of magnetic material. The stator core 13 is fixed between the end plate 12 and a valve housing 31 by crimping both axial ends of the yoke 11. The stator core 13 has a housing 14 accommodating the plunger 17 and an attracting portion 15. The housing 14 and the attracting portion 15 are formed integrally into a seamless cylindrical tube. The attracting portion 15 attracts the plunger 17 when they are energized magnetically. A non-magnetic material is provided on an inner surface of the housing 14 or an outer surface of the plunger 17 by a coating or plating to prevent the plunger 17 from sticking to the housing 14. The attracting portion 15 has a perpendicular surface 15a and a tapered surface 15b corresponding to a tapered surface 17a formed on the plunger 17. The perpendicular surface 15a supports a stopper 19 which provides a solid metal gap. A coil 20 covered with a resin is placed on a radial outside of the housing 14 and the attracting portion 15, between two end flanges of the stator core 13. The coil 20 is fixed by the yoke 11 and the stator core 13.

A shaft 18 is press-fitted into the plunger 17. An end of the shaft 18 rests on an end of a spool 30. The spool 30 is movably accommodated and supported by a valve housing 31, which allows it to move in a reciprocating fashion. A thrust spring 40 as a resilient member, disposed in an opposite end of the spool 30 with respect to the shaft 18, pushes the spool 30 toward the shaft 18. Therefore, the shaft 18 and the spool 30 move together. The valve housing 31 has an inlet port 32, an outlet port 33, a feedback port 34 and a drain port 35 on a cylindrical wall thereof. In this embodiment, an oil pump (not shown) supplies oil to the inlet port 32 from a tank (not shown). The outlet port 33 is connected to an actuator of the automatic transmission. The oil supplied from the outlet port 33 is also supplied to the feedback port 34 and a feedback chamber 36. The drain port 35 is connected to the tank. The spool 30 has two large lands 37 and 38 and a small land 39 to change a communicating condition between the ports. The large land 38 and the small land 39 define the feedback chamber 36 with the valve housing 31. Therefore, the pressurized oil in the feedback chamber 36 provides a biasing force in a direction toward the large land 38. The feedback chamber 36 compensates a fluctuation of input pressure. The large land 38 controls an amount of oil which flows from the inlet port 32 to the outlet port 33. This amount depends on a changeable seal length between the large land 38 and an inner surface 31a. The large land 37 controls an amount of oil which flows from the outlet port 33 to the drain port 35, the amount depending on a changeable seal length between the large land 37 and an inner surface 31b.

In this embodiment, a position of the spool 30 is determined according to a thrust force provided by the spring 40, a thrust force generated by oil in the feedback chamber 36 and a thrust force provided by the solenoid 10. Therefore, the position of the spool 30 is linearly controlled only by the solenoid 10.

When the coil 20 is not energized, the spool 30 stops in a position where the forces are balanced. In this case, the inlet port 32 and the outlet port 33 communicate to increase a controlled pressure in the outlet port 33 to a maximum pressure.

When the coil 20 is energized, the plunger 17 is attracted toward the attracting portion 15 according to an amount of exciting current flowing through the coil 20. when a maximum current is supplied to the coil 20, the plunger 17 and the spool 30 move to the most attracted position where the plunger 17 rests on the stopper 19. In this case, the outlet port 33 and the drain port 35 are opened to decrease a controlled pressure of oil in the outlet port 33 to atmospheric pressure. When an intermediate current is supplied to the coil 20, the plunger 17 and the spool 30 is positioned in an intermediate position. Therefore, the pressure in the outlet port 33 is controlled according to the current.

Figure 2:
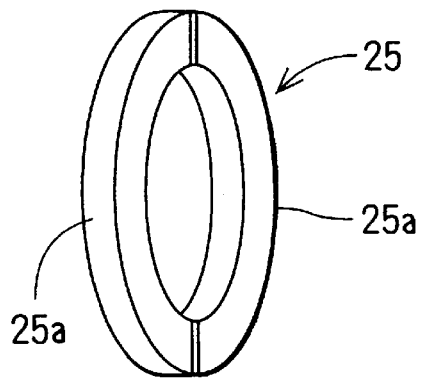
FIG. 2 is a perspective view of a magnet according to the first embodiment of the present invention.
Figure 3:
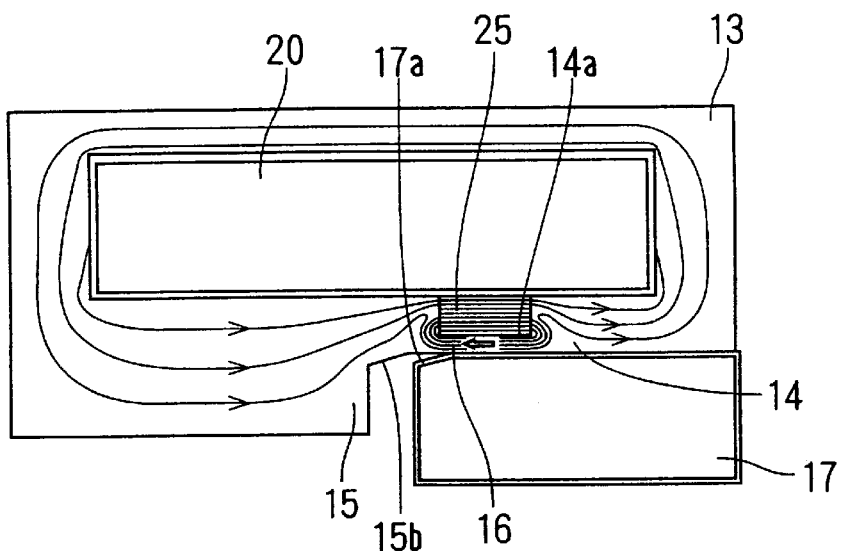
FIG. 3 is a sectional view of a solenoid showing a magnetic flux according to the first embodiment of the present invention.
Figure 4:
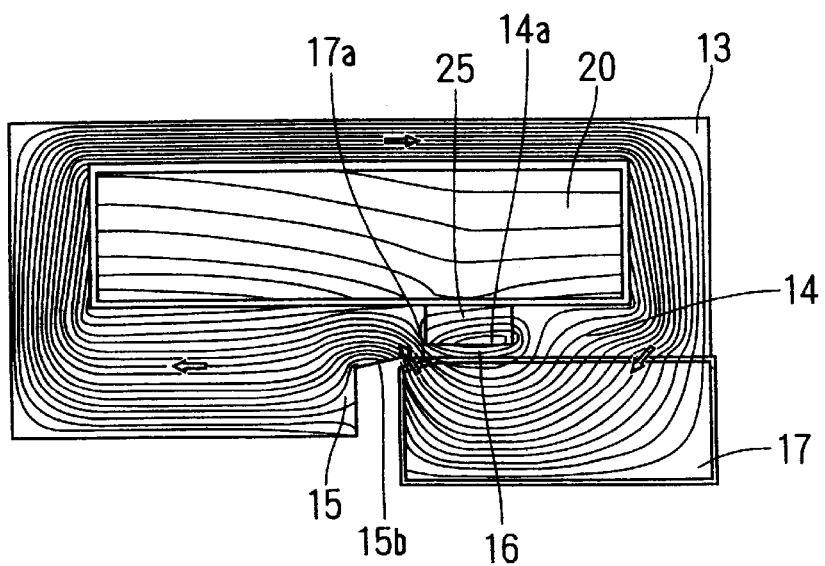
FIG. 4 is a sectional view of a solenoid showing a magnetic flux according to the first embodiment of the present invention.

In this embodiment, an annular concave portion 14a is formed on an outer surface of the housing 14 to provide a thin wall 16 on the housing 14 as a magnetic restricting portion. This concave portion 14a accommodates an annular permanent magnet 25 composed of a plurality of magnets. The magnet 25 is disposed between the thin wall 16 and the coil 20. As shown in FIG. 2, the permanent magnet 25 is composed of two half magnets 25a. As shown in FIG. 3, the magnet 25 supplies a magnetic flux (hereafter referred to as a magnet flux) through the thin wall 16. As shown in FIG. 4, the coil 20 generates a flux (hereafter referred to as a coil flux) in the thin wall 16 when the coil 20 is energized. The magnet 25 is magnetized in an axial direction. A direction of the magnet flux and the coil flux are the same. The thin wall 16 is saturated with only the magnet flux. The thickness of the thin wall 16 is designed to maintain a sufficient mechanical strength. Therefore, the magnet 25 is designed to have a sufficient magnetization to bring the thin wall 16 into the saturation.

Figure 5:
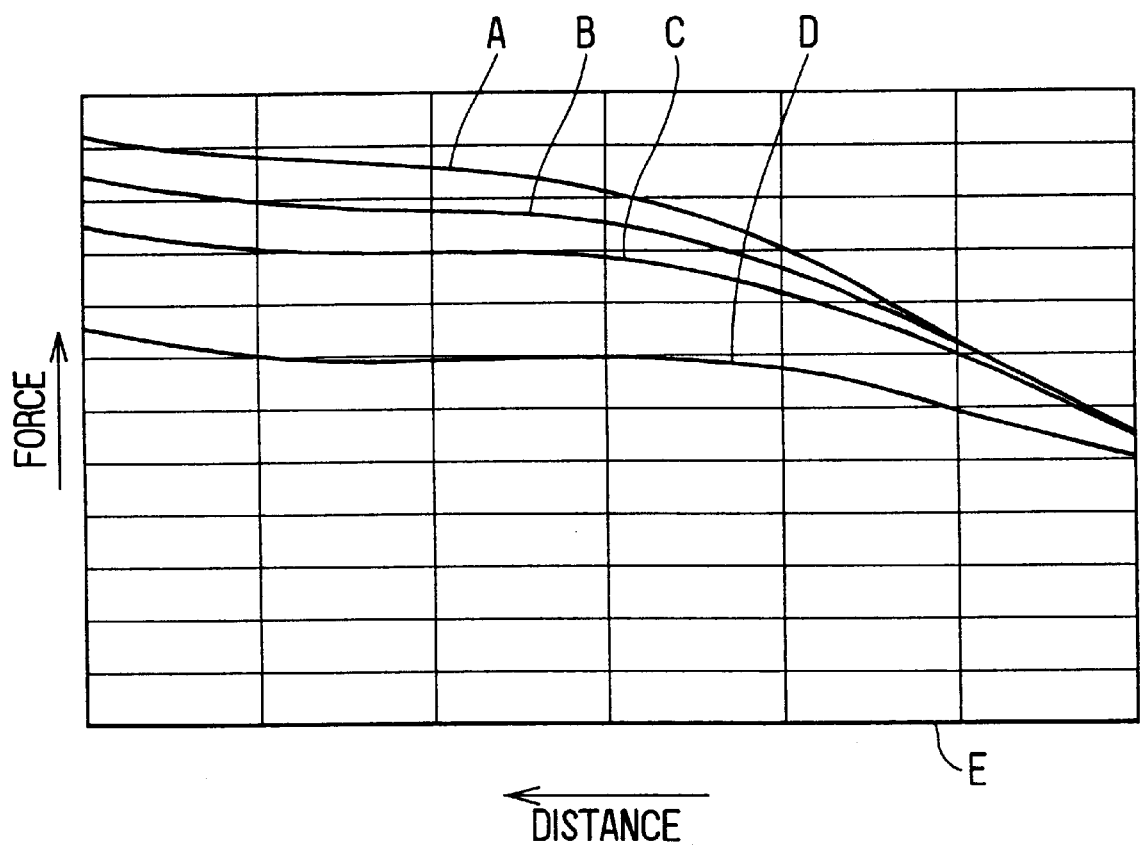
FIG. 5 is a graph showing a attracting force of solenoids.

The coil flux can't flow in the thin wall 16 because the thin wall 16 is already saturated with the magnet flux. Therefore, the coil flux flows through a circumferential surface of the plunger 17 and the tapered surface 17a. The magnet 25 increases an attracting force by preventing leakage flux passing through the thin wall 16. Referring to FIG. 5, lines A, B, and C indicate the attracting forces generated by the solenoid 10 using the permanent magnet 25. The magnetizations of the permanent magnet 25 (residual flux) are decreased in A, B and C order. Line D shows the attracting force without the permanent magnet. Line E shows the attracting force when the coil 20 is not energized in the cases A, B and C.

In this embodiment, it is possible to increase the attracting force and to maintain a diameter of the solenoid 10 because the magnet 25 is disposed in the concave portion 14a.

SECOND EMBODIMENT

Figure 6:
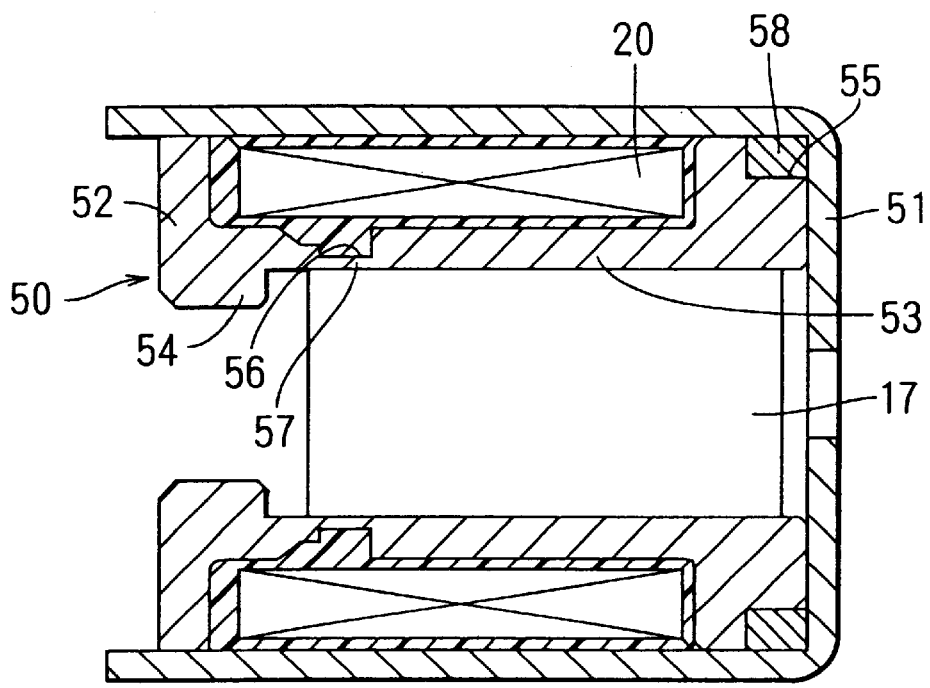
FIG. 6 is a sectional view of a solenoid according to a second embodiment of the present invention.
Figure 7:
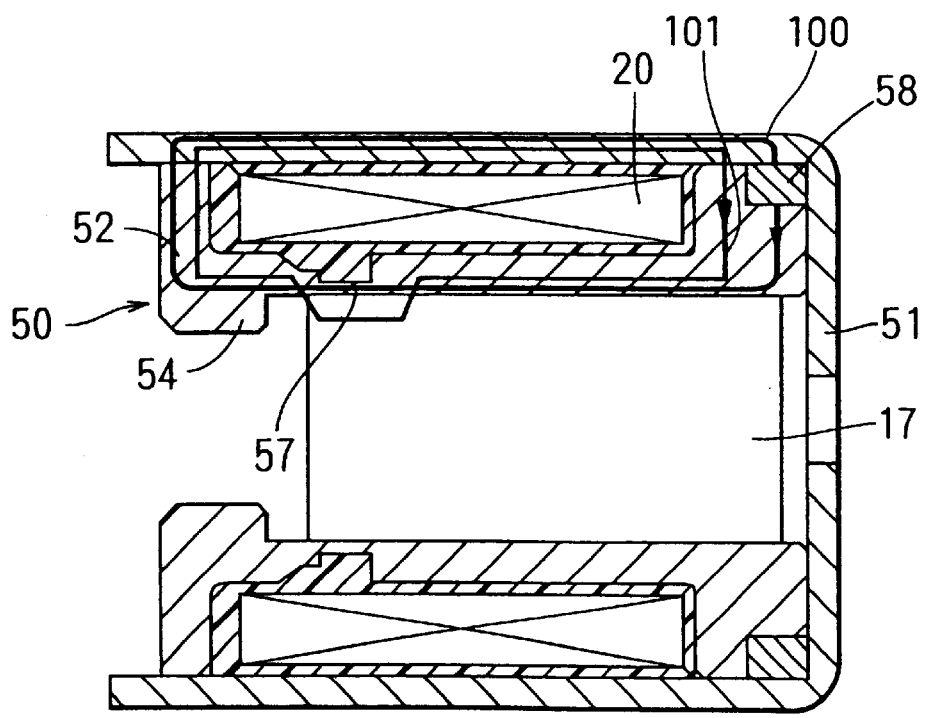
FIG. 7 is a sectional view of a solenoid showing a magnetic flux according to the second embodiment of the present invention.

Referring to FIG. 6 and FIG. 7, a solenoid portion of a second embodiment is shown. In the second embodiment, the magnet 58 is located in an outer rear corner of a stator 50. The stator 50 has a cup-shaped yoke 51 and a stator core 52. The stator core 52 provides an extended housing 53 and a shortened attracting portion 54 for accommodating a plunger 17. In this embodiment, the plunger 17 is formed as a columnar shape. The stator core 52 provides a thin wall 57 between the housing 53 and the attracting portion 54 by, forming a concave portion 56 on an outer surface. The concave portion 56 is defined by a tapered surface on a front side near the attracting portion and a perpendicular step surface on a rear side. The stator core 52 has two flanges on both ends. The flange located on the rear side has an annular groove 55 on a radial and axial outer corner. The groove 55 accommodates a ring-shaped permanent magnet 58. The magnet generates the magnet flux 100 in the same direction as the coil flux 101. In this embodiment, it is possible to assemble the ring-shaped magnet from an axial side.

THIRD EMBODIMENT

Figure 8:
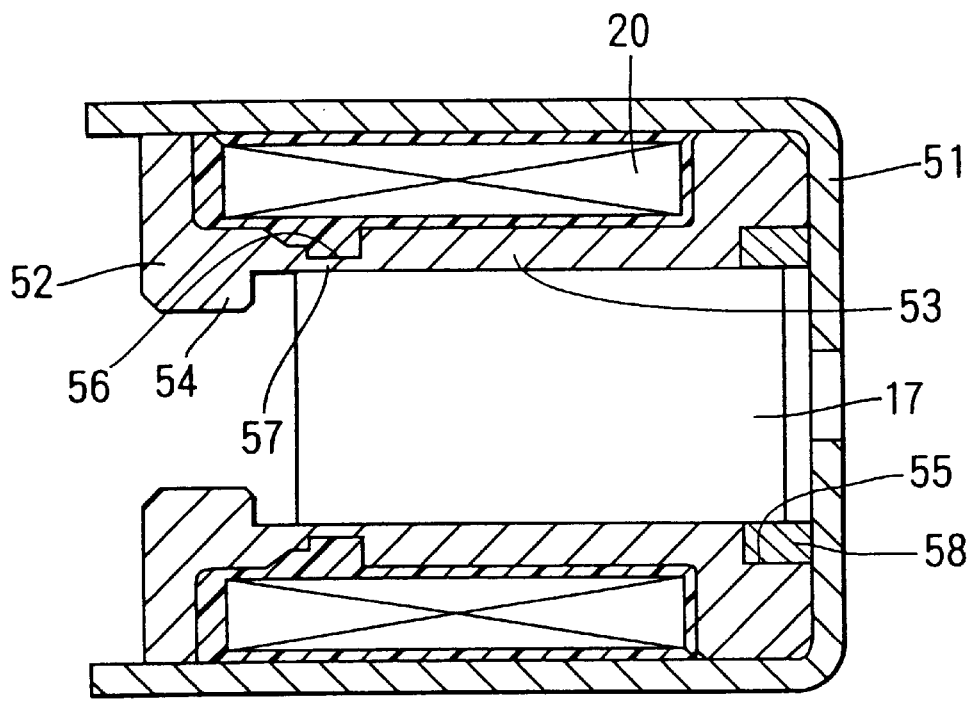
FIG. 8 is a sectional view of a solenoid according to a third embodiment of the present invention.

Referring to FIG. 8, a third embodiment of the present invention is shown. Here, an annular groove 55 is formed on a radial inner corner of the flange of the stator 352. The annular groove 55 accommodates a ring-shaped magnet 58.

FOURTH EMBODIMENT

Figure 9:
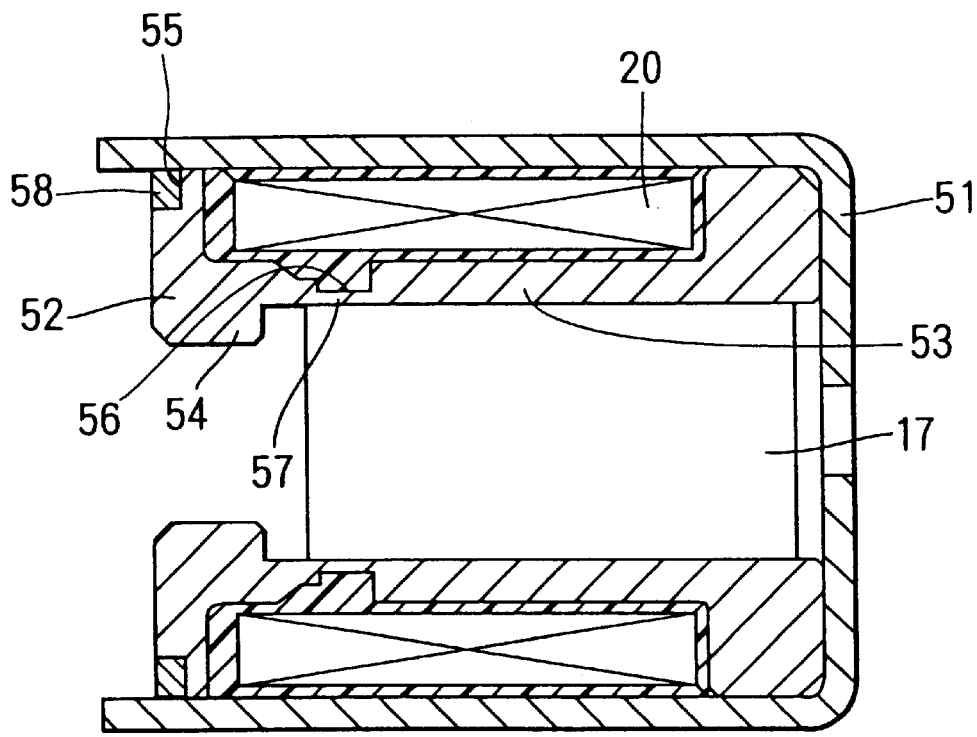
FIG. 9 is a sectional view of a solenoid according to a fourth embodiment of the present invention.

Referring to FIG. 9, a fourth embodiment of the present invention is shown. Here, an annular groove 55 is formed on a radial and axial outer corner of the flange located on the attracting portion side of the stator 52. The annular groove 55 accommodates a ring-shaped magnet 58.

Figure 10:
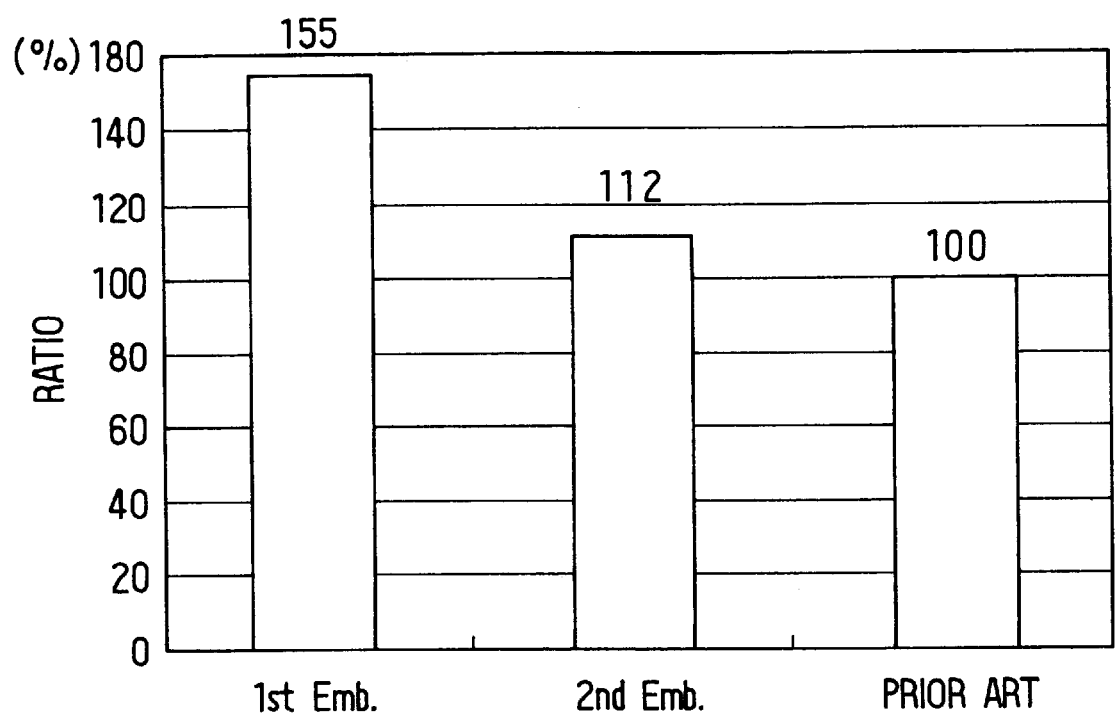
FIG. 10 is a graph showing a ratio of the attracting force of the first and second embodiment to a prior art.

Referring to FIG. 10, the first embodiment and the second embodiment can increase the attracting force. The third embodiment and the fourth embodiment can provide an improvement similar to the second embodiment. Further the magnet may be located on the yoke.

FIFTH EMBODIMENT

Figure 11:
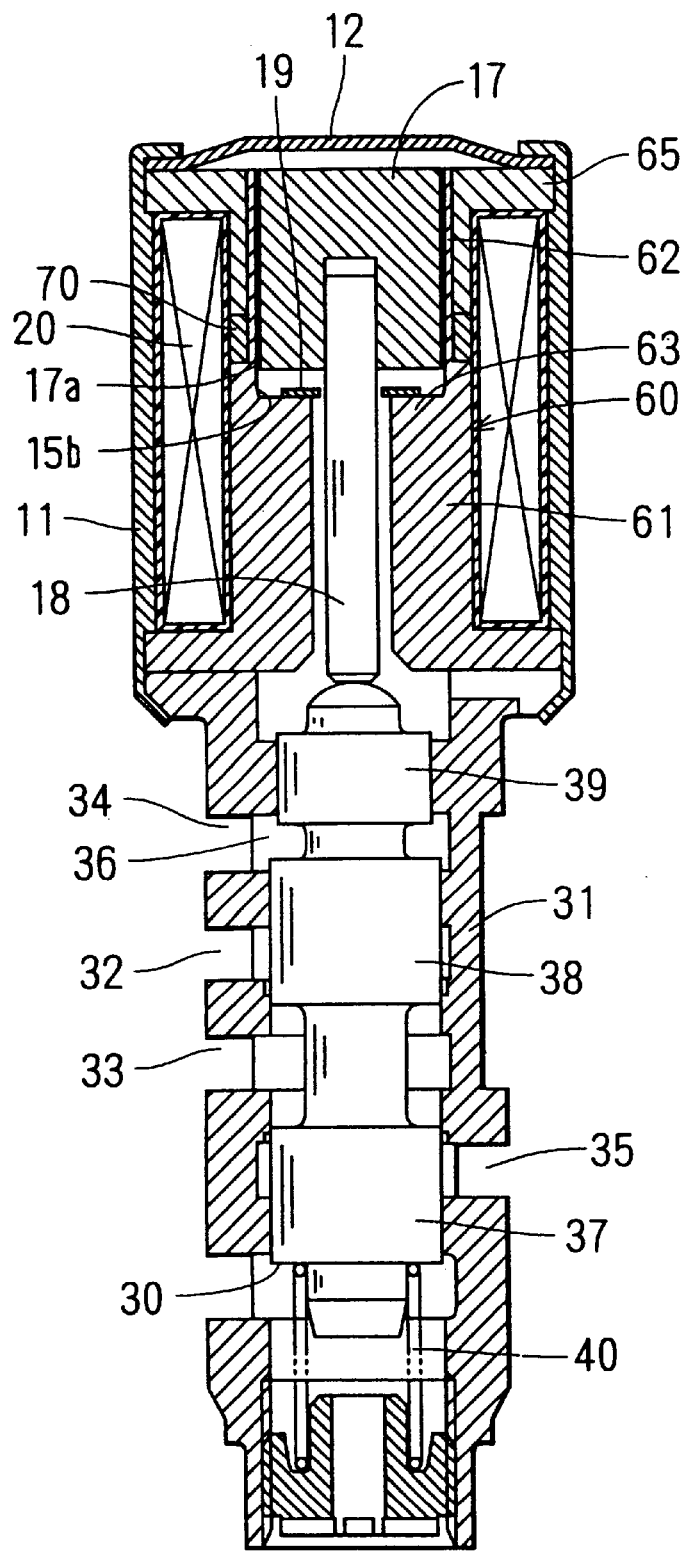
FIG. 11 is a sectional view of a valve according to a fifth embodiment of the present invention.

Referring to FIG. 11, a fifth embodiment of the present invention is shown. Here, the stator 60 is divided into a cylindrical first core 61 and a plate-shaped second core 65. The first core 61 has an end flange, an attracting portion 63 and a cylindrical thin housing 62 having the same thickness as the thin wall 16 of the first embodiment. The second core 65 has a cylindrical portion located on an outside of the thin housing 62 and a flange. The first core 61 and the second core 65 form an annular groove therebetween for accommodating and supporting a ring-shaped permanent magnet 70. The ring-shaped magnet 70 can be assembled between the cores 61 and 65 along an axial direction.

SIXTH EMBODIMENT

Figure 12:
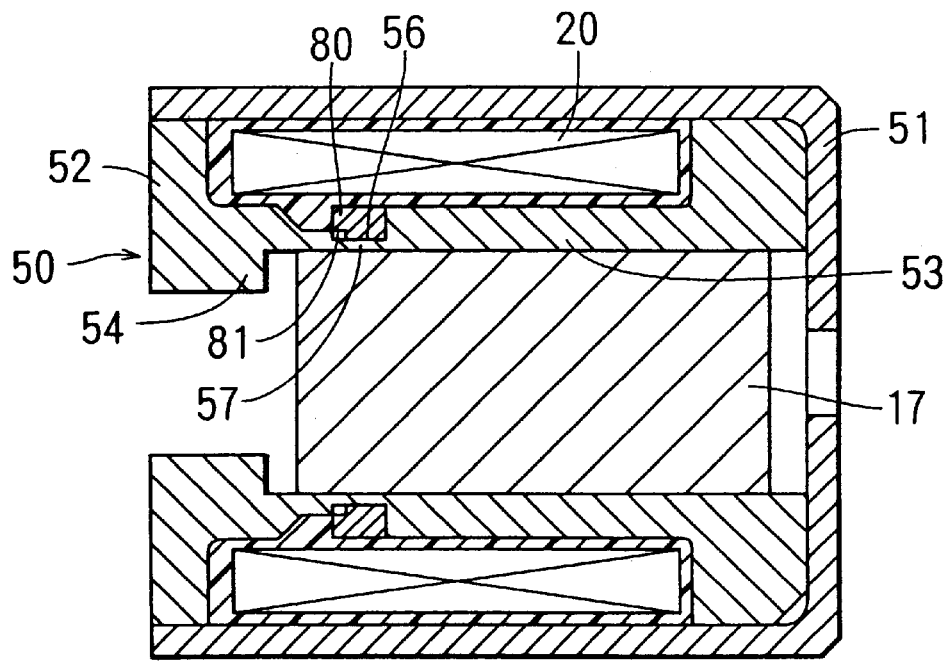
FIG. 12 is a sectional view of a solenoid according to a sixth embodiment of the present invention.
Figure 13:
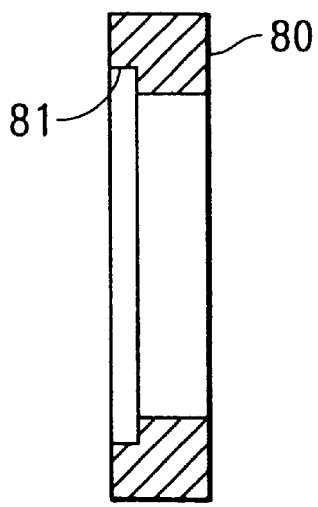
FIG. 13 is a sectional view of a magnet according to the sixth embodiment of the present invention.
Figure 15:
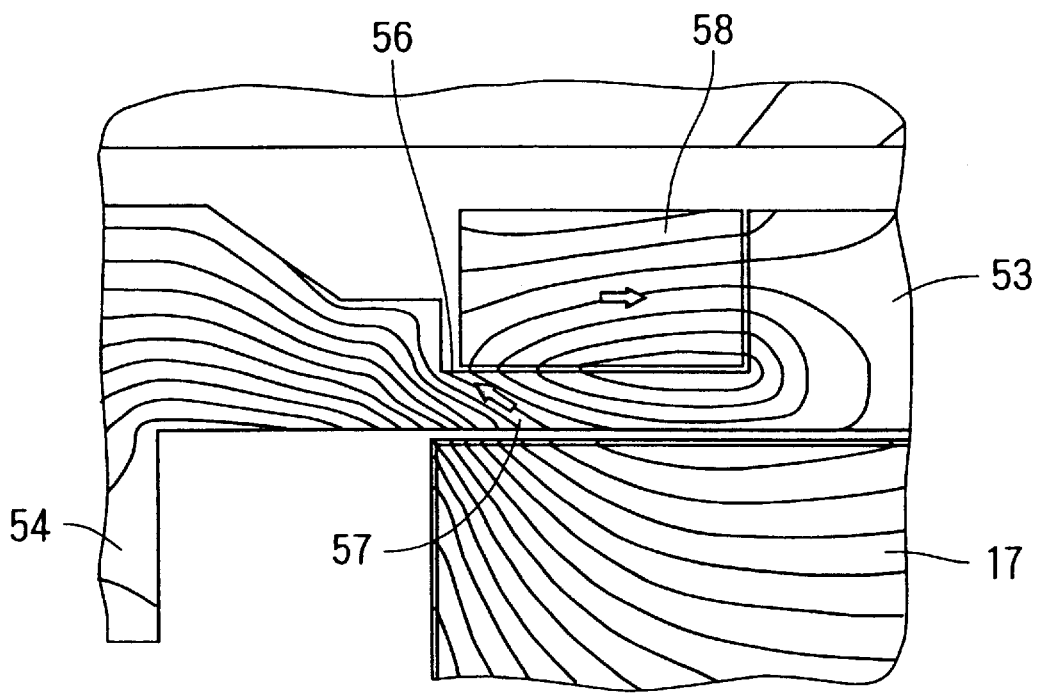
FIG. 15 is a sectional view showing a magnetic flux of a comparative embodiment.
Figure 17:
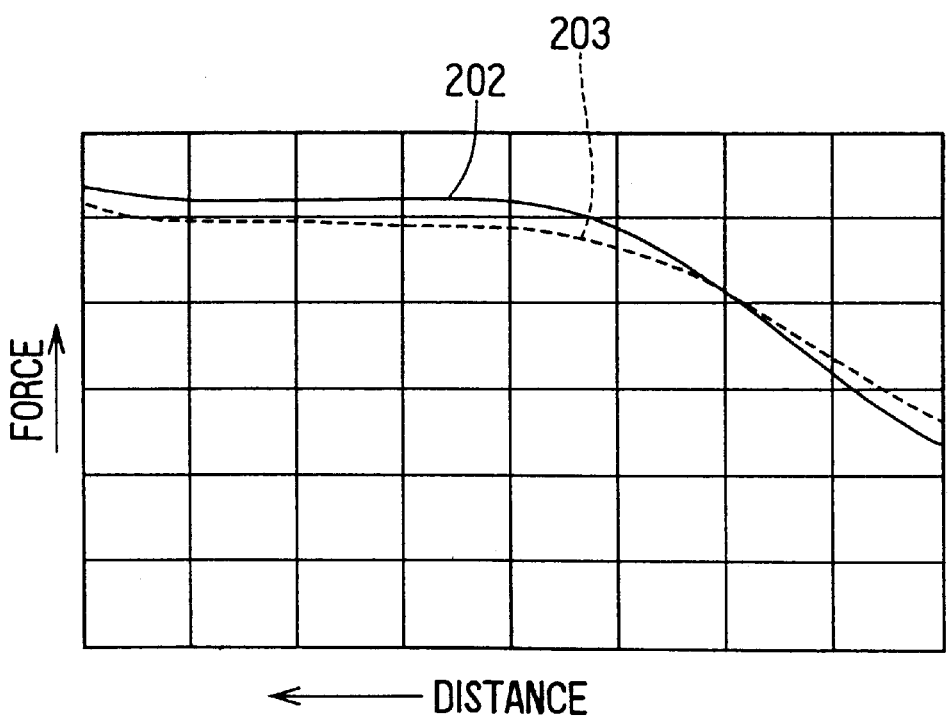
FIG. 17 is a graph showing an attracting force according to the comparative embodiment.

Referring to FIG. 12, a sixth embodiment of the present invention is shown. Here, a permanent magnet 80 has a groove 81 which is a cut-off portion. The groove 81 is located on a front side of the magnet 80 near the attracting portion 54. The groove 81 is only formed on a radial inner corner. The groove 81 maintains a positional accuracy of the plunger 17 by preventing a demagnetization of the magnet 80. A comparative embodiment is shown in FIG. 15 and FIG. 17. In the case of the comparative embodiment, the coil flux concentrates at an attracting portion side of the concave portion 56 where a corner of the magnet 58 is located. A direction of the concentrated coil flux is opposite to a magnetization of the magnet 58. Therefore, the coil flux demagnetizes the magnet 58. Specifically, the permanent magnet easily demagnetizes at high temperature. For instance, when the solenoid is operated at high temperature, the magnet 58 in FIG. 15 is demagnetized and the attracting force is decreased from a line 202 to a line 203. Such change in the attracting force changes the controlled position of the plunger 17. Therefore, a control accuracy of the plunger 17 is lowered.

Figure 14:
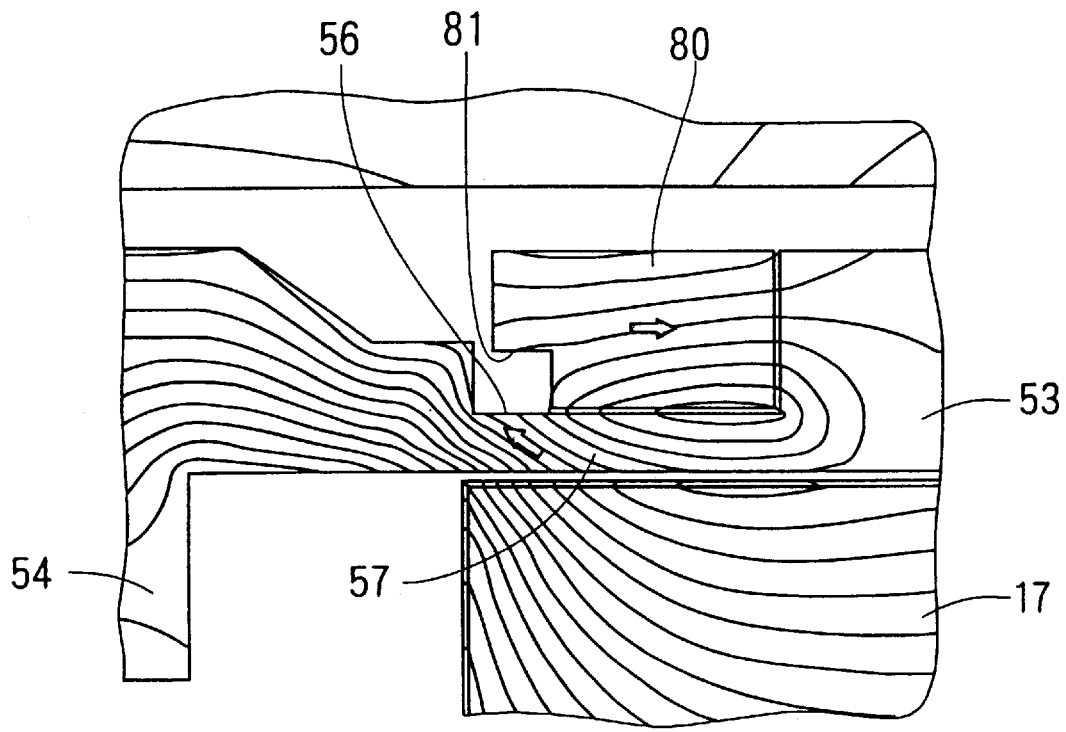
FIG. 14 is a sectional view showing a magnetic flux according to the sixth embodiment of the present invention.
Figure 16:
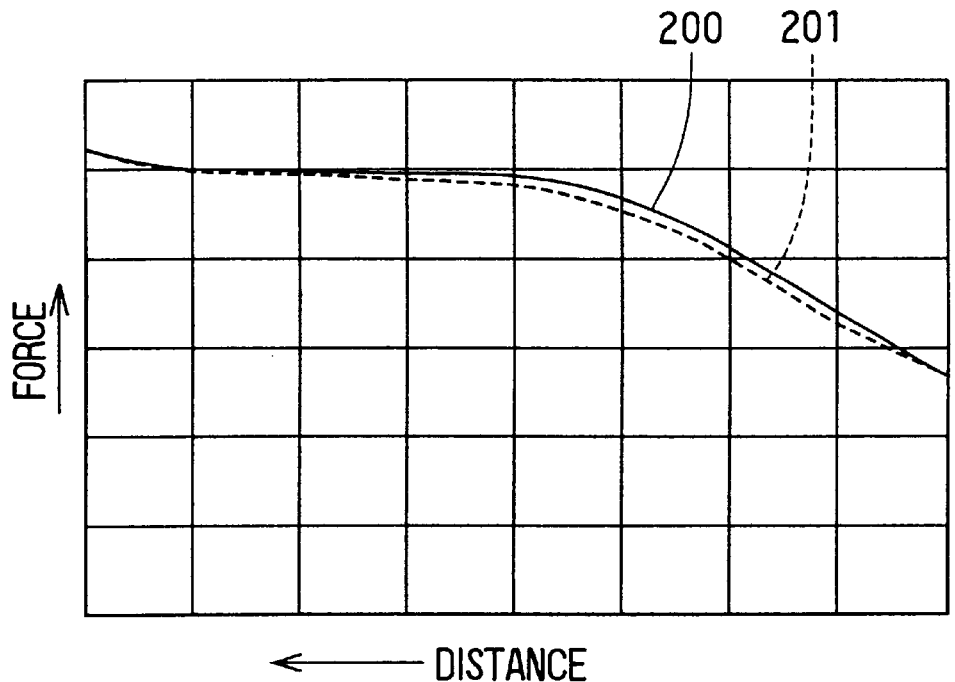
FIG. 16 is a graph showing an attracting force according to the sixth embodiment of the present invention.

Referring to FIG. 14, the coil flux is prevented from passing through the corner of the magnet 80. Therefore, there is little 5 difference between the attracting forces of lines 200 and 201 in FIG. 16. In this embodiment, the groove 81 must be formed on the attracting portion side inner corner even the coil flux is generated in an opposite direction.

SEVENTH EMBODIMENT

Figure 18:
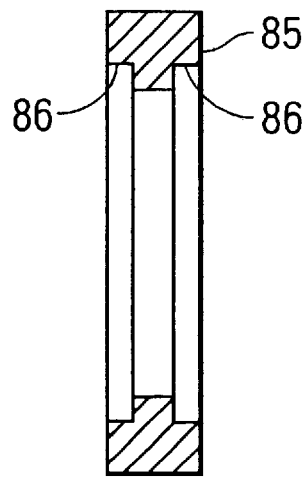
FIG. 18 is a sectional view of a magnet according to a seventh embodiment of the present invention.

Referring to FIG. 18, a permanent magnet 85 has grooves 86 and 86 on both sides. In this embodiment, both sides of the magnet 85 can be placed on the attracting portion side.

EIGHTH EMBODIMENT

Figure 19:
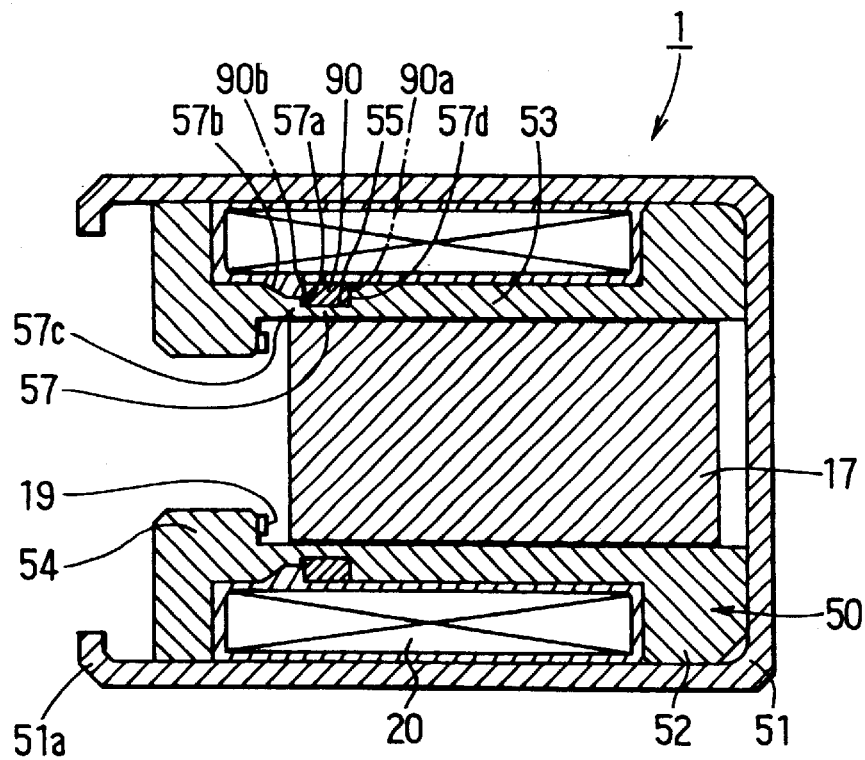
FIG. 19 is a sectional view of a solenoid according to an eighth embodiment of the present invention.

Referring to FIG. 19, the concave portion 55 accommodates a permanent magnet 90 having an N pole 90a and an S pole 90b on axial ends respectively. In this embodiment, the concave portion 55 has perpendicular walls 57a and 57d which hold the magnet 90 therebetween. The stator core 52 has a tapered portion 57b located between the concave portion 55 and the attracting portion 54 to provide a cone shaped magnetic flux path. An inclined outer surface of the tapered portion 57b forms an obtuse angle with an axis of the solenoid for guiding a magnetic flux into an axial direction. For instance, the tapered portion 57b is formed with the concave portion 55 by cutting process. The tapered portion 57b is only located in a front side where the attracting portion 54 is located. The tapered portion 57b is still located on a radial outside of an inner cylindrical bore of the stator core 52. The tapered portion 57b permits to use a simplified stator core 52 having a straight inner surface and a simplified plunger 17 having a straight outer surface. The stator core 52 has a middle portion 57c having a thickness between the housing 53 and the thin wall 57 located between the tapered portion 57b and the concave portion 55. In this embodiment, the thin wall 57 is located close to the attracting portion 54 so that the housing 53 is longer than a cylindrical portion located between the thin wall 57 and the attracting portion 54. Therefore, an outer surface of the plunger 17 mainly faces an inner surface of the housing 53. The plunger 17 is formed as a columnar-shaped armature for providing a larger surface to oppose the inner surface of the housing 53.

Figure 20:
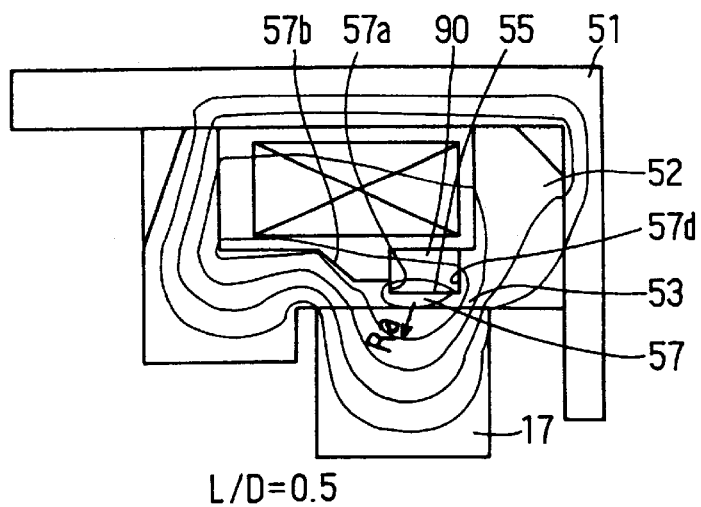
FIGS. 20, 21 and 22 are sectional views of solenoids each showing a magnetic flux for an electromagnetic actuator according to the present invention.
Figure 21:
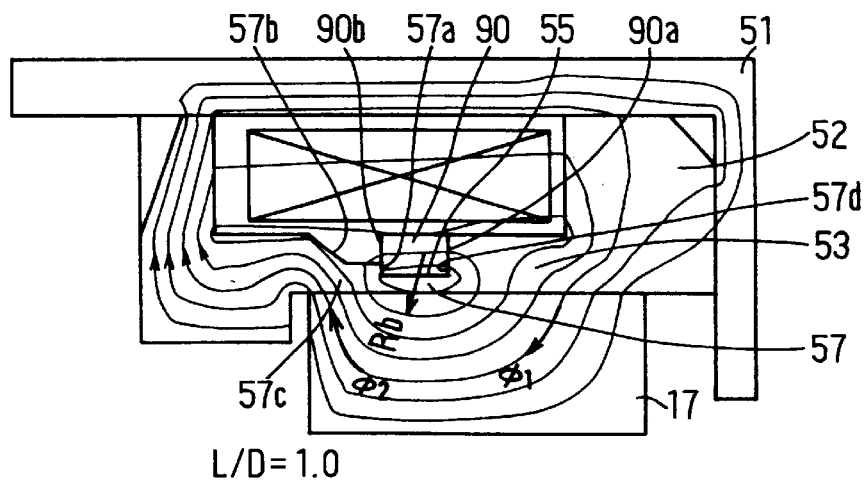
Figure 22:
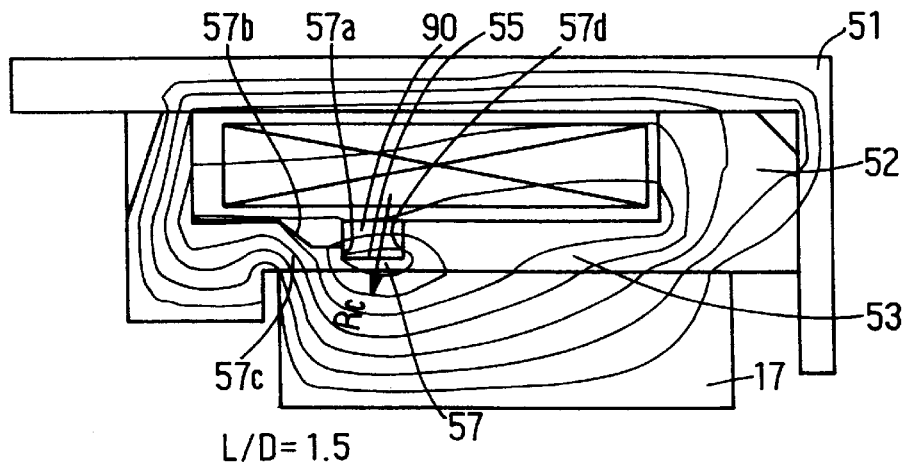
Figure 23:
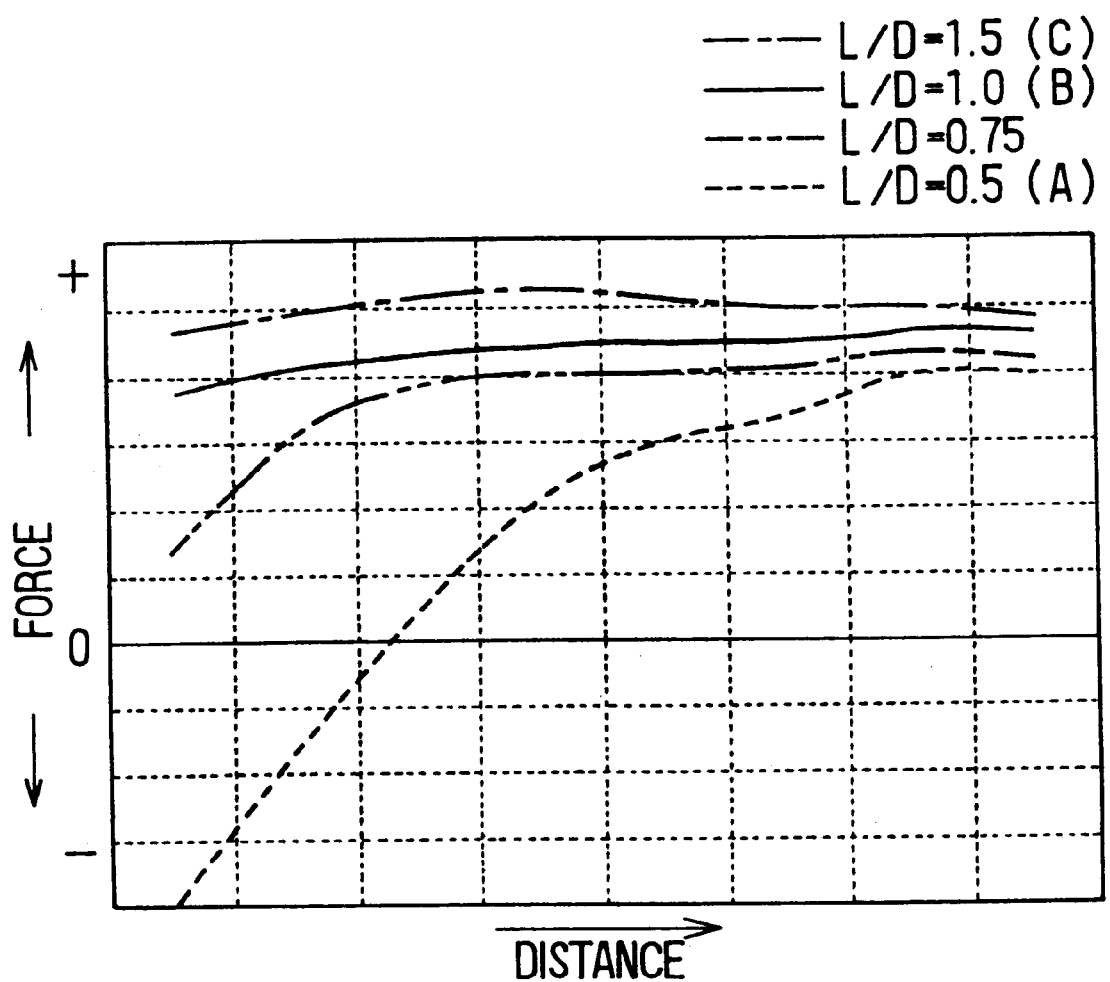
FIG. 23 is a graph showing attracting forces for an electromagnetic actuator according to the present invention.
Figure 24:
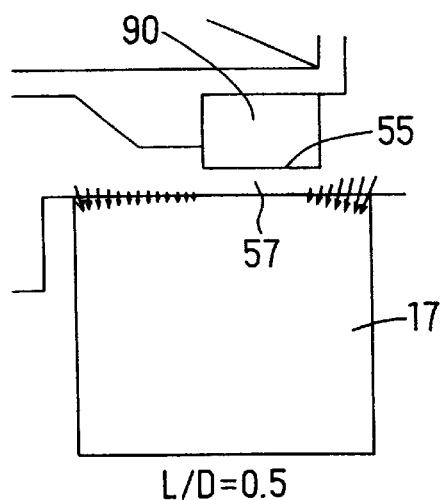
FIGS. 24, 25 and 26 are sectional views of solenoids each showing directions of the magnetic flux for an electromagnetic actuator according to the present invention.
Figure 25:
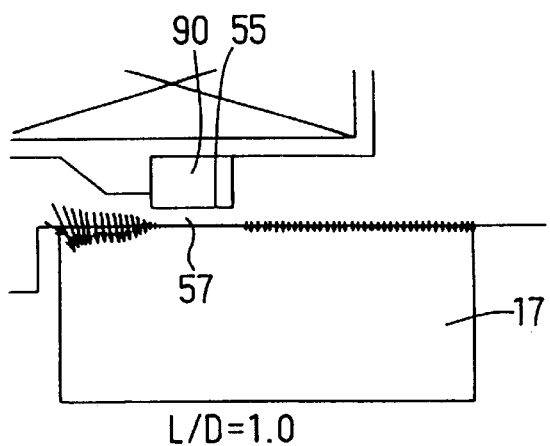
Figure 26:
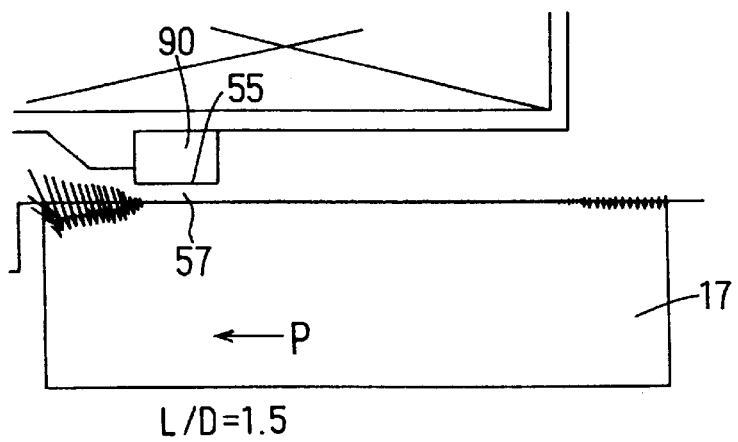

The plunger 17 has an axial length L and a diameter D. A ratio L/D is set not less than 1.0 based on the following analysis. In this embodiment, the ratio L/D is set about 2.0. FIGS. 20 to 23 show magnetic flux paths and FIGS. 24 to 26 show direction of the magnetic flux at the surface of the plunger. As shown in FIGS. 20 and 24, in the case of L/D=0.5, an axial length of the thin wall 57 is about 40% of the axial length L of the plunger 17. In this case, the magnetic flux generally runs in a radial direction and is almost the same direction and density as magnetic flux acting on both axial ends of the plunger 17. As shown in FIGS. 21 and 25, when L/D=0.75, the axial length of the thin wall 57 is about 20% of the axial length L of the plunger 17. In this case, the magnetic flux runs in the radial direction in the plunger 17. The magnetic flux from the housing 53 to the plunger 17 spreads over a wide surface area of the rear end of the plunger 17. The magnetic from the plunger 17 to the middle portion 57c concentrates in a narrow surface area of the front end of the plunger 17. As shown in FIGS. 22 and 26, in the case of L/D=1.0, the thin wall 57 is located on the front end of the plunger 17, and the axial length of the thin wall 57 is about 15% of the axial length L of the plunger 17. In this case, the magnetic flux runs in the axial direction and is concentrated at the frond end of the plunger 17. FIG. 23 shows characteristics of the attracting force according to the ratio L/D. when L/D=0.5 and L/D=0.75, the attracting force is small when the plunger 17 moves only a small distance. When L/D=1.0 and L/D=1.5, the attracting force is maintained constant. Therefore, the ratio L/D must be not less than 1.0 for providing a constant attracting force. In this embodiment, the perpendicular surface 57a and the middle portion 57c may be formed into a tapered portion.

NINTH EMBODIMENT

Figure 27:
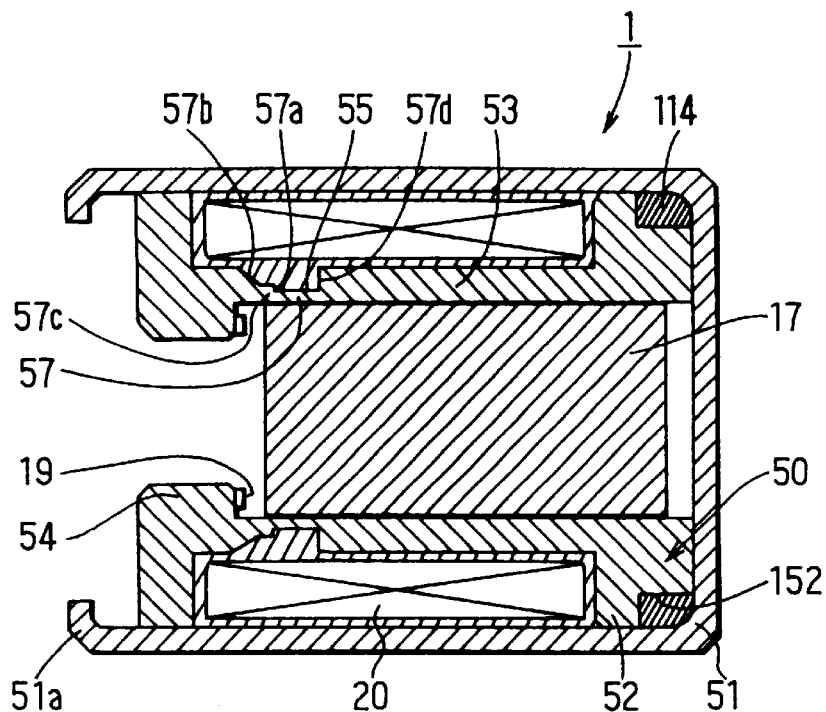
FIG. 27 is a sectional view of a solenoid according to a ninth embodiment of the present invention.

Further, as shown in FIG. 27, a permanent magnet 114 may be located in a groove 152 formed on an axial end corner of the stator core 52. The coil flux is scattered in the axial end flange of the stator core where the magnet 114 is located.

TENTH EMBODIMENT

Figure 28:
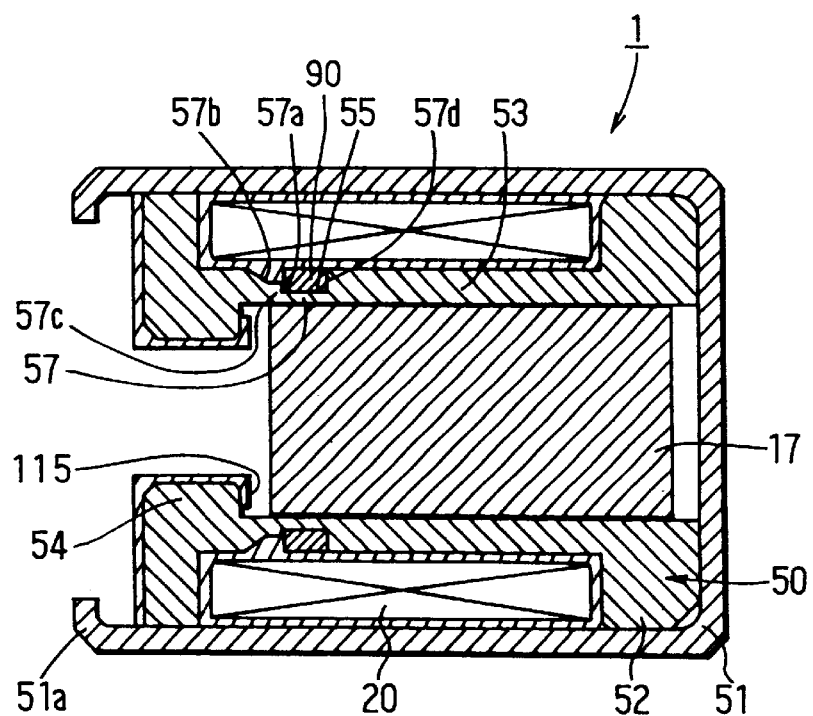
FIG. 28 is a sectional view of a solenoid according to a tenth embodiment of the present invention.
Figure 29:
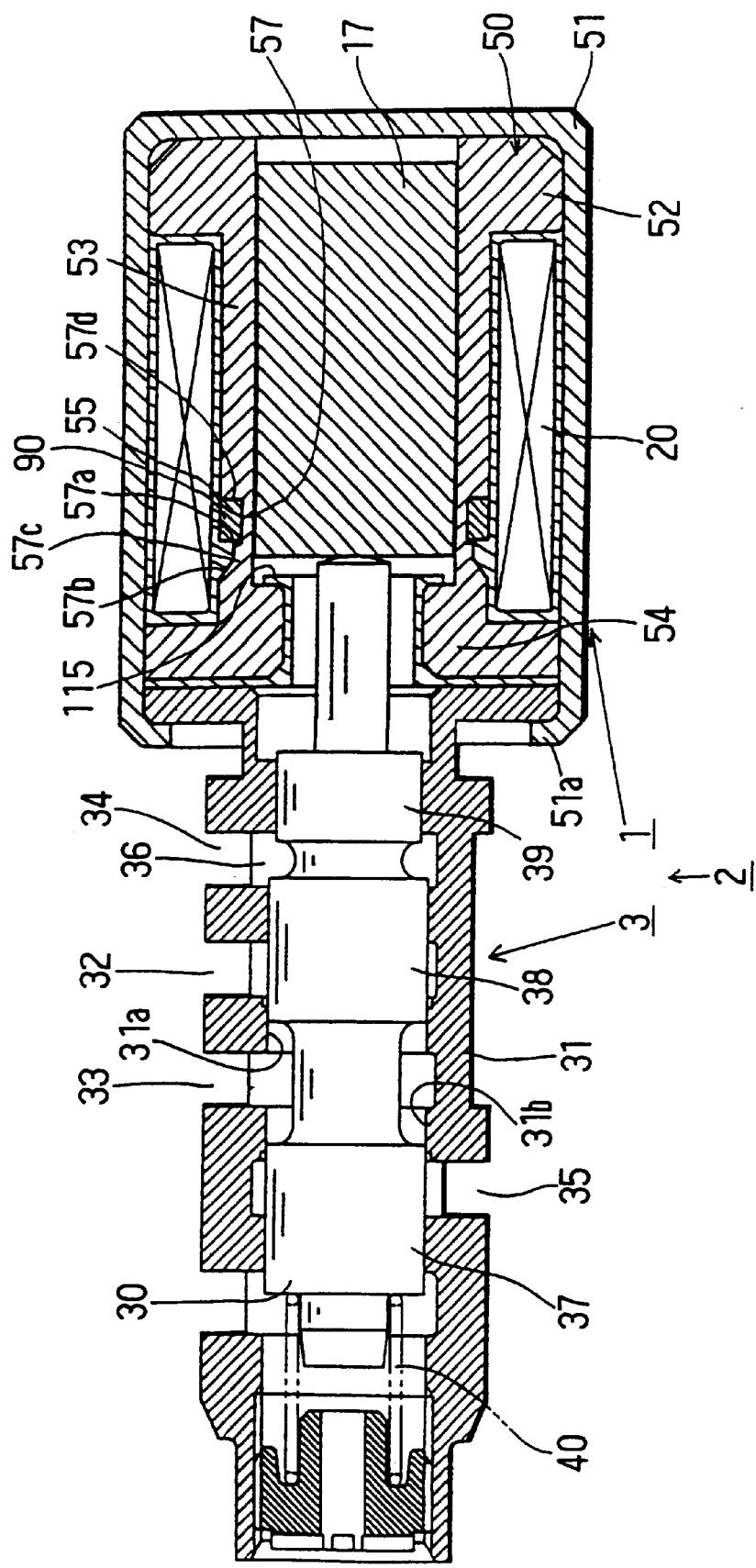
FIG. 29 is a sectional view of a valve according to the tenth embodiment of the present invention.

Further, as shown in FIG. 28, the attracting portion 54 may be covered with a material as a stopper 115. FIG. 29 shows a spool type hydraulic control valve having a solenoid portion shown in FIG. 28. In this embodiment, the spool 30 directly rests on the plunger 17. The yoke 51 is shaped as a cup with a closed bottom. A crimped portion 51a of the yoke 51 connects the solenoid portion and the spool valve portion.

ELEVENTH EMBODIMENT

Figure 30:
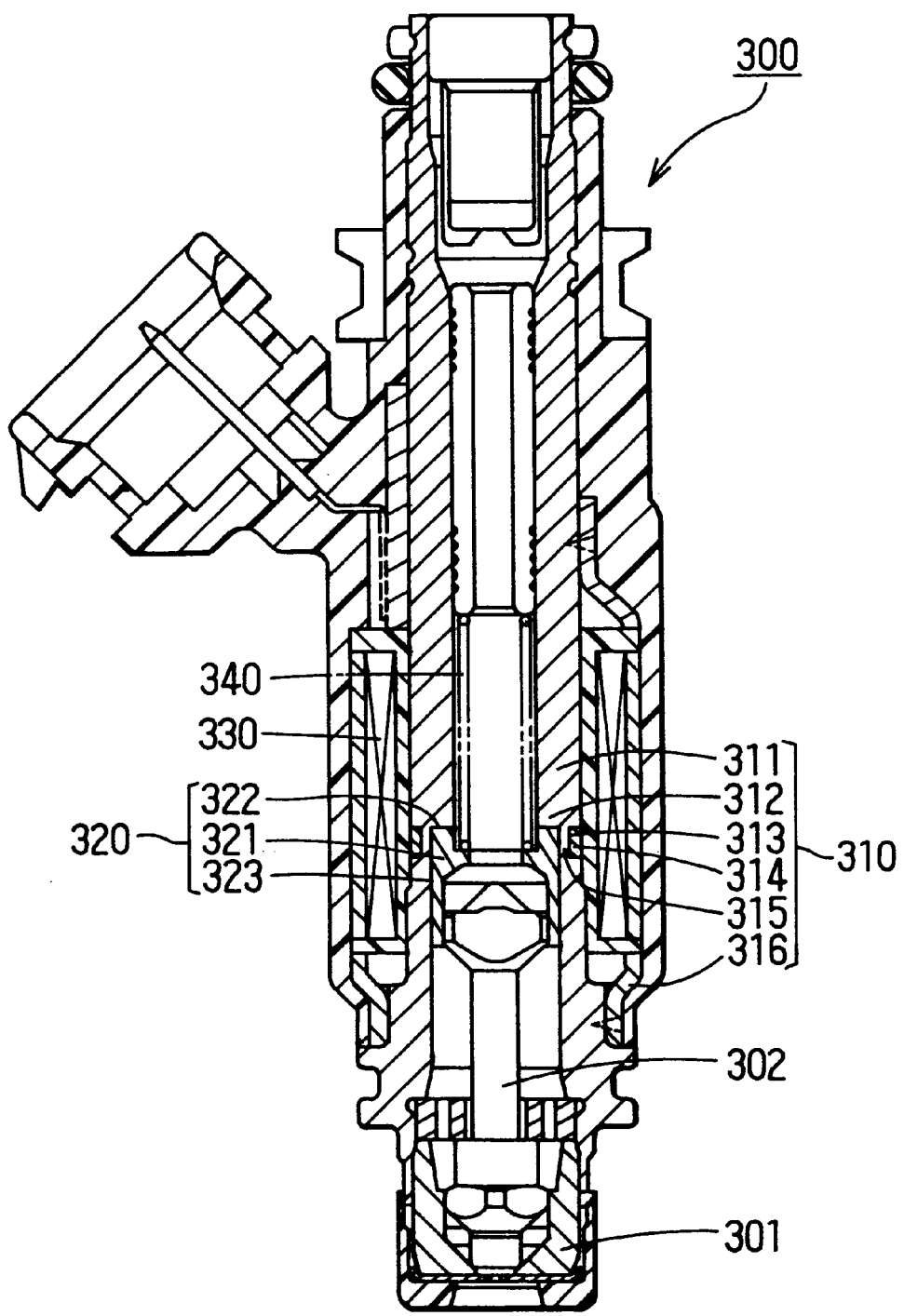
FIG. 30 is a sectional view of a fuel injector according to an eleventh embodiment of the present invention.

FIG. 30 shows a ninth embodiment of the present invention. Here, the present invention is used with an injector for supplying fuel to an internal combustion engine. The injector 300 has a valve body 301 having a valve seat and a needle valve 302 movably supported relative to the valve seat. The needle valve 302 is reciprocally operated by an electromagnetic actuator having a stator 310, an armature 320 and a coil 330. The stator 310 has a tube-shaped stator core 311 and a plate 316 which are made of a magnetic material to provide a magnetic flux path. The stator core 311 has an attracting portion 312 having a surface perpendicular to an axis of the injector 300. The stator core 311 provides an annular groove 313 for accommodating an annular permanent magnet 314 that is composed of a plurality of magnets. The annular groove 313 is formed on an outside of the stator core to provide a thin wall 315. The magnet 314 generates a magnetic flux through the thin wall 315 in the same direction as a magnetic flux generated by the coil 330. The armature 320 has a cylindrical armature core 321 fixed on an upper end of the needle valve 302. The armature core 321 has an end surface 322 facing the attracting portion 312 and an outer surface 323 facing an inner surface of the stator core 311. The annular groove 313 and the thin wall 315 are located on a radial outside of the armature core 321 near the end surface 322. The stator core 311 is formed as a seamless tube. The coil 330 is located outside of the stator core 311 so that the groove 313 is covered with the coil 330. A spring 340 is disposed to push the needle valve 302 against the valve body 301.

When the coil is not energized, a magnetic flux of the magnet 314 flows through the thin wall 315 and saturates the thin wall 315. The armature core 321 is not attracted toward the attracting portion by the magnetic flux of the magnet 314.

When the coil is energized, the coil 330 generates the magnetic flux flowing through the stator core 311, the plate 316 and the armature core 321. The magnetic flux mainly flows into the armature core 321 because the thin wall 315 has already saturated by the magnet 314. Accordingly, the armature core 321 is attracted toward the attracting portion 312. As a result, the armature core 321 lifts the needle valve 302 form a valve seat to inject fuel. In this embodiment, the tube-shaped stator core 311 improves a seal performance.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic actuator, comprising:
   an armature made of a magnetic material;
   a stator core made of a magnetic material and having a housing movably accommodating said armature in an axial direction, said stator core having an attracting portion located on an axial end;
   a coil disposed on an outside of said stator core for generating a magnetic flux passing through said armature and said stator core; and
   a permanent magnet disposed on said stator core for generating a magnetic flux passing through said housing in the same direction as said magnetic flux generated by said coil, wherein said housing has a thin wall located on a radial outside of said armature.

2. An electromagnetic actuator according to claim 1, wherein said magnet is located on said housing.

3. An electromagnetic actuator according to claim 1, wherein said housing has a concave portion where said permanent magnet is fixed.

4. An electromagnetic actuator according to claim 3, wherein said permanent magnet has a front side located near said attracting portion, said front side having a cut-off portion on a radial inner corner.

5. An electromagnetic actuator according to claim 4, wherein said permanent magnet has a rear side located opposite to said attracting portion, said rear side having a cut-off portion on a radial inner corner.

6. An electromagnetic actuator according to claim 1, wherein said stator core has an axial end portion where said permanent magnet is located.

7. An electromagnetic actuator according to claim 1, wherein said magnet is formed with an annular shape.

8. An electromagnetic actuator according to claim 1, wherein said housing has a portion magnetically saturated with said magnetic flux generated by said permanent magnet.

9. An electromagnetic actuator according to claim 1, wherein said thin wall is magnetically saturated with said magnetic flux of said permanent magnet.

10. An electromagnetic actuator according to claim 1, wherein said permanent magnet is located on a portion where a magnetic flux of said coil is scattered.

11. An electromagnetic actuator according to claim 1, wherein said housing has a tapered portion, said tapered portion decreasing in cross sectional area from said attracting portion to said thin wall.

12. An electromagnetic actuator according to claim 1, wherein said housing has a stopper, said armature resting on said stopper.

13. An electromagnetic actuator according to claim 1, wherein said armature is a column having an axial length L and a diameter D, said column having a ratio L/D which is not less than 1.0.

14. An electromagnetic actuator according to claim 1, further comprising:
- a cylindrical valve housing having a plurality of ports forming a fluid passage;
- a spool disposed in said valve housing and operated by said armature, said spool for changing a communicating condition between said ports; and
- a resilient member pushing said spool against an attracting direction of said armature.

15. An electromagnetic actuator according to claim 14, wherein said fluid is oil, and said ports includes an output port where a controlled pressure of oil is supplied.

16. An electromagnetic actuator, comprising:
- an armature movably supported in an axial direction;
- a stator core made of a magnetic material having a seamless housing accommodating said armature, said housing having a thin wall located on a radial outside of said armature;
- a coil disposed on an outside of said stator core for generating a magnetic flux passing through said armature and said stator core; and
- a permanent magnet disposed on a radial outside of said thin wall, said permanent magnet having poles on both axial ends to generate a magnetic flux passing through said thin wall in the same direction as said magnetic flux generated by said coil.

17. An electromagnetic actuator according to claim 16, wherein said permanent magnet includes a plurality of permanent magnets arranged into an annular shape to surround said thin wall.

18. An electromagnetic actuator according to claim 16, wherein said housing has a guide portion only located between said concave portion and an one axial end of said stator core for guiding a magnetic flux in an axial direction.

19. An electromagnetic actuator, comprising:
- an armature made of a magnetic material;
- a stator core made of a magnetic material and having a housing movably accommodating said armature in an axial direction, said stator core having an attracting portion located on an axial end;
- a coil disposed on an outside of said stator core for generating a magnetic flux passing through said armature and said stator core; and
- a permanent magnet disposed on said stator core for generating a magnetic flux passing through said housing in the same direction as said magnetic flux generated by said coil, wherein said housing has a concave portion where said permanent magnet is fixed.

20. An electromagnetic actuator according to claim 19, wherein said permanent magnet has a front side located near said attracting portion, said front side having a cut-off portion on a radial inner corner.

21. An electromagnetic actuator according to claim 20, wherein said permanent magnet has a rear side located opposite to said attracting portion, said rear side having a cut-off portion on a radial inner corner.

22. An electromagnetic actuator according to claim 19, wherein said concave portion is located radial outside of said armature and is magnetically saturated with said magnetic flux generated by said permanent magnet.

23. An electromagnetic actuator according to claim 22, wherein said housing has a tapered portion, said tapered portion decreasing in cross sectional area from said attracting portion to said concave portion.

24. An electromagnetic actuator according to claim 23, further comprising:
- a cylindrical valve housing having a plurality of ports forming a fluid passage;
- a spool disposed in said valve housing and operated by said armature, said spool for changing a communicating condition between said ports; and
- a resilient member pushing said spool against an attracting direction of said armature.

25. An electromagnetic actuator, comprising:
- an armature made of a magnetic material;
- a stator core made of a magnetic material and having a housing movably accommodating said armature in an axial direction, said stator core having an attracting portion located on an axial end;
- a coil disposed on an outside of said stator core for generating a magnetic flux passing through said armature and said stator core; and
- a permanent magnet disposed on said stator core for generating a magnetic flux passing through said housing in the same direction as said magnetic flux generated by said coil, wherein said stator core has an axial end portion where said permanent magnet is located, and
- wherein said housing and said attracting portion are magnetically connected via a magnetic restricting portion disposed therebetween, the magnetic restricting portion being magnetically saturated by magnetic flux supplied by said permanent magnet.

26. An electromagnetic actuator according to claim 25, wherein said magnet is formed with an annular shape.

27. An electromagnetic actuator according to claim 25, wherein said housing has a portion magnetically saturated with said magnetic flux generated by said permanent magnet.

28. An electromagnetic actuator according to claim 27, wherein said permanent magnet is located on a portion where a magnetic flux of said coil is scattered.

29. An electromagnetic actuator according to claim 28, further comprising:
- a cylindrical valve housing having a plurality of ports forming a fluid passage;
- a spool disposed in said valve housing and operated by said armature, said spool for changing a communicating condition between said ports; and
- a resilient member pushing said spool against an attracting direction of said armature.

30. An electromagnetic actuator, comprising:
- an armature made of a magnetic material;
- a stator core made of a magnetic material and having a housing movably accommodating said armature in an axial direction, said stator core having an attracting portion located on an axial end;
- a coil disposed on an outside of said stator core for generating a magnetic flux passing through said armature and said stator core; and
- a permanent magnet disposed on said stator core for generating a magnetic flux passing through said housing in the same direction as said magnetic flux generated by said coil, wherein said permanent magnet is located on a portion where a magnetic flux of said coil is scattered.

31. An electromagnetic actuator according to claim 30, wherein said housing has a portion magnetically saturated with said magnetic flux generated by said permanent magnet.

32. An electromagnetic actuator according to claim 31, further comprising:
- a cylindrical valve housing having a plurality of ports forming a fluid passage;
- a spool disposed in said valve housing and operated by said armature, said spool for changing a communicating condition between said ports; and
- a resilient member pushing said spool against an attracting direction of said armature.

33. An electromagnetic actuator, comprising:
an armature made of a magnetic material;
- a stator core made of a magnetic material and having a housing movably accommodating said armature in an axial direction, said stator core having an attracting portion located on an axial end;
- a coil disposed on an outside of said stator core for generating a magnetic flux passing through said armature and said stator core; and
- a permanent magnet disposed on said stator core for generating a magnetic flux passing through said housing in the same direction as said magnetic flux generated by said coil, wherein said housing has a tapered portion, said tapered portion decreasing in cross sectional area from said attracting portion to a portion located radial outside of said armature.

34. An electromagnetic actuator according to claim 33, wherein said portion located radial outside of said armature is magnetically saturated with said magnetic flux generated by said permanent magnet.

35. An electromagnetic actuator according to claim 34, further comprising:
- a cylindrical valve housing having a plurality of ports forming a fluid passage;
- a spool disposed in said valve housing and operated by said armature, said spool for changing a communicating condition between said ports; and
- a resilient member pushing said spool against an attracting direction of said armature.

36. An electromagnetic actuator, comprising:
an armature made of a magnetic material;
- a stator core made of a magnetic material and having a housing movably accommodating said armature in an axial direction, said stator core having an attracting portion located on an axial end;
- a coil disposed on an outside of said stator core for generating a magnetic flux passing through said armature and said stator core; and
- a permanent magnet disposed on said stator core for generating a magnetic flux passing through said housing in the same direction as said magnetic flux generated by said coil, wherein said armature is a column having an axial length L and a diameter D, said column having a ratio L/D which is not less than 1.0, and
wherein said housing and said attracting portion are magnetically connected via a magnetic restricting portion disposed therebetween, the magnetic restricting portion being magnetically saturated by magnetic flux supplied by said permanent magnet.

37. An electromagnetic actuator according to claim 36, further comprising:
- a cylindrical valve housing having a plurality of ports forming a fluid passage;
- a spool disposed in said valve housing and operated by said armature, said spool for changing a communicating condition between said ports; and
- a resilient member pushing said spool against an attracting direction of said armature.

* * * * *